United States Patent [19]
Larker et al.

[11] Patent Number: 5,549,770
[45] Date of Patent: Aug. 27, 1996

[54] METHOD FOR MANUFACTURING COMPOSITES

[75] Inventors: Hans Larker, Robertsfors; Robert Lundberg, Trollhattan; Bertil Mattsson; Jan Nilsson, Both of Robertsfors; Lars Pejryd, Trollhattan, all of Sweden

[73] Assignee: Volvo Aero Corporation, Trollhattan, Sweden

[21] Appl. No.: 313,225

[22] PCT Filed: Mar. 30, 1993

[86] PCT No.: PCT/SE93/00266

§ 371 Date: Nov. 30, 1994

§ 102(e) Date: Nov. 30, 1994

[87] PCT Pub. No.: WO93/20024

PCT Pub. Date: Oct. 14, 1993

[30] Foreign Application Priority Data

Apr. 3, 1992 [SE] Sweden .................................. 9201080

[51] Int. Cl.$^6$ .............................. C04B 37/00; B29C 43/00
[52] U.S. Cl. ................................................ 156/89; 264/325
[58] Field of Search ........................... 264/60, 241, 257, 264/319, 325, 125; 156/89

[56] References Cited

U.S. PATENT DOCUMENTS

| | | | |
|---|---|---|---|
| 4,053,011 | 10/1977 | Riewald et al. | 164/97 |
| 4,919,594 | 4/1990 | Wright et al. | 416/230 |
| 5,024,978 | 6/1991 | Allaire et al. | 501/95 |
| 5,211,776 | 5/1993 | Weiman | 148/525 |
| 5,225,015 | 7/1993 | Allaire et al. | 156/89 |
| 5,294,387 | 3/1994 | Nakano et al. | 264/60 |

OTHER PUBLICATIONS

Patent Abstracts of Japan, vol. 6, No. 186, C–126, abstract of JP–A–57–101627 (INOUE JAPAX KENKYUSHO K. K.) Jun. 24. 1982.

*Primary Examiner*—Christopher A. Fiorilla
*Attorney, Agent, or Firm*—Pollock, Vande Sande & Priddy

[57] ABSTRACT

A method of manufacturing fiber-reinforced composites from a fibrous material, includes the steps of infiltrating the fibrous material with material from which a matrix is built up; preforming the infiltrated fibrous material into a green body against as shape-imparting body; encapsulating the preformed green body and shape-imparting body; consolidating and sintering the encapsulated green body by means of isostatic pressure sintering into an essentially dense composite body while preventing deformation of the green body with the shape-imparting body; and removing the encapsulated green body and shape-imparting body after isostatic pressure sintering.

16 Claims, 1 Drawing Sheet

METHOD FOR MANUFACTURING COMPOSITES

TECHNICAL FIELD

The invention relates to a method of manufacturing bodies with improved fracture toughness by means of hot-isostatic pressing/isostatic pressure sintering, in the form of composites in which long fibers are arranged in a matrix of ceramic or metal.

BACKGROUND ART OF THE INVENTION

In many demanding application, such as components for gas turbines, rocket engines and other types of structural members for which a high reliability is required, a brittle fracture behavior is unacceptable. Brittle materials often lead to fracture without plastic deformation having preceded the fracture, or if the breaking stress is locally exceeded following the stress concentration which arises near a microcrack or other defect. This reduces the possibility of detecting faulty parts by inspection or estimating service lives by statistical methods and replacing these parts prior to a breakdown.

The above applies preferably to ceramics which are very strong but for which the strength is reduced and the variation in strength values between individual parts becomes great as a consequences of the inability of absorbing stresses by plastic deformation as well as the occurrence of internal defects in the form of microcracks and other inhomogeneities. Thus, they result in fracture when the weakest link breaks. The same is also true of certain metallic materials, preferably in high-temperature applications, where changes in the microstructure as a result of diffusion and grain growth increase the tendency to brittle fracture behavior. One way of avoiding brittle fractures is to reinforce with fibers. Fiber reinforcement gives greater fracture toughness and safety against fracture because when the strength is locally exceeded, the fracture does not propagate spontaneously through the part but the fiber take up and redistribute the stresses in the same way as when one of a large number of parallel-connected links breaks. In this way, defects can be detected and critical components be replaced during a regular overhaul.

Known methods for manufacturing ceramics reinforced with long fibers are of two main types, namely:

Preform infiltration: A three-dimensional fiber preform is manufactured. The preform is then infiltrated with a ceramic matrix. During the infiltration the ceramic matrix may be supplied:

in gaseous phase, whereby the fibers included in the fiber preform constitute a substrate on which the ceramic matrix is built by precipitation from the gaseous phase, Chemical Vapor Infiltration (CVI);

in liquid form, whereby the ceramic particles which build up the ceramic matrix are supplied to the fiber preform suspended in a liquid polymer, in the form of a sol or suspended in a powder slurry, and the built-up ceramic matrix is bonded to the fiber preform by reaction with a gas. Irrespective of how the fiber preform is infiltrated, the ceramic matrix is built in the void between the fibers without the fibers being packed more densely. Ceramic fiber composites produced by infiltration in the manner described above typically result in a material with a porosity of from 10 to 15 per cent by volume.

Uniaxial pressure sintering: Fibers are mixed with ceramic powder and are formed into a green body. The green body is consolidated and sintered under uniaxial pressure. Often the ceramic matrix comprises a ceramic with a low melting point which is densified via a viscous flow. Typical matrices for ceramic fiber composites produced by means of uniaxial pressure sintering are glass and glass ceramics in the X-aluminium silicate system where X preferably consists of any of the substances Li, Mg, Ca, Zr or Y. During the pressure sintering both the ceramic matrix and the fibers are packed together, and completely dense materials can be obtained under favorable conditions. Also green bodies formed by winding of infiltrated fiber bundles have been consolidated and sintered by means of uniaxial pressure sintering. The applicability of the method, because the pressure is applied uniaxially, is limited to simple geometries. Also limitations as regards magnitude and compacting pressure are very pronounced in the case of uniaxial pressure sintering.

In addition to the methods described above, test bars, with simple geometries of silicon nitride containing continuous carbon fibers have been manufactured by enclosing green bodies in glass, consolidating the bodies and sintering them by means of hot-isostatic pressing.

SUMMARY OF THE INVENTION

One object of the present invention is to propose a method for the manufacturing of composites reinforced with long fiber without the limitations regarding the geometries of the body which are described above.

During the manufacturing of a composite body according to the invention, a fibrous material, in the form of a long fiber thread comprising a large number of fibers, a single long fiber a mono-filament, or a fibre fabric, in the following referred to as fiber thread/fibre fabric, is infiltrated with a matrix whereafter a green body is preformed from the infiltrated fiber thread/fibre fabric. The matrix preferably comprises ceramic materials such as silicon nitride, silicon carbide, aluminium oxide, mullite, yttrium oxide or yttrium aluminium garnet (YAG) but can also comprise metallic materials. The fibre thread/fiber fabric preferably consists of carbon boron, silicon carbide, silicon nitride, Si—N—C— 101 fibers or aluminium (sapphire) fibers. The fiber thread/ fiber fabric may be coated, for example with boron nitride, to prevent undesired reactions between the fibers and the matrix or to control the shearing strength between the fibers and the matrix.

According to the invention, the infiltrated fiber thread/ fiber fabric is formed into a green body of the desired shape against a shape-imparting body. This shape-imparting body may be a core which gives the composite body its inner contour or a shape-imparting outer casing which gives the composite body its outer contour or comprise shape-imparting parts which shape both the inner and outer contours of the composite body. After drying, the green body together with the shape-imparting body is surrounded by an encapsulation which is impenetrable to the pressure medium used during the isostatic pressure sintering. Thereafter, the green body is sintered and consolidated into an essentially dense ceramic-ceramic body by isostatic pressure sintering, hot-isostatic pressing. After the isostatic pressure sintering, the encapsulation and the shape-imparting body are removed. The shape-imparting body is preferably made of a material which retains its shape-imparting properties under the pressure and temperature conditions which prevail during the isostatic pressure sintering, such as graphite or boron nitride.

The pressure and the temperature for the isostatic pressure sintering are, of course, chosen in dependence on the material included in the matrix and in the fiber thread/fiber fabric. By preforming a green body starting from an infiltrated fiber thread/fiber fabric, surrounding the green body together with the shape-imparting body by an encapsulation before the isostatic pressure sintering, essentially dense composite bodies can be manufactured irrespective of the geometry.

Infiltration of the fiber thread/fiber fabric preferably takes place by passing the fiber thread/fiber fabric through at least one bath containing the above-mentioned powder slurry, whereby the fiber thread/fiber fabric is infiltrated with the material suspended in the powder slurry containing at least the ceramic materials from which the ceramic matrix is to be built up.

The powder slurry is prepared by the addition of a solvent such as cyclohexane, a ketone, ethanol or any other alcohol, to a content of 30 to 80, preferably to around 60, parts by volume, to the powdered material. Of course, any suitable dispersion and suspension-promoting agents as well as other surface-active agents are added to ensure that an essentially fully covering and even slurry infiltrates the fiber thread/fiber fabric. In addition, if there is a need of green strength, a suitable organic binder is added, such as, for example, an acrylic binder. As described above, the fiber thread/fiber fabric may pass through more than one powder slurry with or without intermediate drying.

As encapsulation there is often used a glass or a glass-forming material which is applied in the form of a powder. After the glass powder has been applied around the preformed green body and the shape-imparting body, the green body, the shape-imparting body and the glass powder are heated, usually under vacuum, to a temperature such that the glass or the glass-forming material forms a dense coherent encapsulation around the green body. During the heating, any organic constituents present in the green body are driven off before the dense encapsulation is formed. As glass which may be used may be mentioned a glass containing 80.3 per cent by weight $SiO_2$, 12.2 per cent by weight $B_2O_3$, 2.8 per cent by weight $Al_2O_3$, 4.0 per cent by weight $Na_2O$, 0.4 per cent by weight $K_2O$ and 0.3 per cent by weight CaO-(Pyrex®)-, a glass consisting of 20–60 per cent by weight $B_2O_3$, 80–40 percent by weight $SiO_2$ and 0–6 per cent weight $Al_2O_3$, further an aluminium silicate containing 58 per cent by weight $SiO_2$, 9 per cent by weight $B_2O_3$, 20 per cent by weight $Al_2O_3$, 5 per cent by weight CaO and 8 per cent by weight MgO, as well as mixtures of particles of substances such as $SiO_2$, $B_2O_3$, $Al_2O_3$ and alkali and alkaline earth metal oxides which form glass upon heating. Further, there may be used a glass containing 96.7 per cent by weight $SiO_2$, 2.9 per cent by weight $B_2O_3$ and 0.4 per cent by weight $Al_2O_3$-(Vycor®)- and mixtures of particles which form glass upon heating.

To prevent the encapsulation material, preferably a glass, from penetrating into open pores or other surface-connected cavities in the green body, form reacting with or adhering to the surface of the ceramic body, at least the green body is first coated with a barrier layer. Normally, the exposed surfaces on both the green body and the shape-imparting body are coated with this barrier layer. The barrier layer may also function as or be supplemented by a release layer to facilitate the removal of the encapsulation after the hot-isostatic pressing.

The above-mentioned barrier layer suitably consists of materials which maintain their crystalline states in contact with the glass as well as the green body and the shape-imparting body at the pressing temperature. Examples of suitable materials are intermediary phases in the system $Al_2O_3$—$SiO_2$ of which mullite $3Al_2O_3 \cdot 2SiO_2$, sillimanite $Al_2O_3 \cdot SiO_2$ and kyanite $Al_2O_3 \cdot SiO_2$ (a high pressure modification of sillimanite) may be mentioned. The barrier layer may also contain a powdered additive consisting of one or more substances such as aluminium oxide, zirconium oxide, titanium boride, silicon nitride, silicon carbide, titanium nitride, boron nitride, or a high-melting glass which does not, or only insignificantly, react with the material in the barrier layer, such that the barrier layer in all essentials maintain its crystalline state. As examples of useful high-melting glass may be mentioned quartz glass and a glass containing 96.7 per cent $SiO_2$, 2.9 per cent by weight $B_2O_3$ and 0.4 per cent by weight $Al_2O_3$-(Vycor®)-. The additive may be included in combination with intermediary phases in the system $Al_2O_3$—$SiO_2$ such as mullite $3Al_2O_3 \cdot 2SiO_2$, sillimanite $Al_2O_3 \cdot SiO_2$ and kyanite $Al_2O_3 \cdot SiO_2$ in contents of up to 60%, preferably to at most 30% of the total dry weight of all constituents in the barrier layer.

In one embodiment, the barrier layer is supplemented by an internal layer which, in addition to preventing the glass from penetrating into open pores or reacting with the castings, also acts as release layer. The release layer is arranged nearest the body to be easily removed from the body, after the hot-isostatic pressing, together with the external barrier layer and the glass encapsulation. The release layer preferably consists of boron nitride. Boron nitride has insignificant or not tendency to react with the ceramic body. Boron nitride in commercially available qualities is well suited for this purpose. As an alternative to boron nitride, it is possible, depending on the material in the composite body, to use other substances with surface structure such as graphite and molybdenum sulphide as well as boron nitride mixed with silicon nitride, silicon carbide, titanium nitride, titanium boride, etc.

The particle size of the powder in the barrier layer is suitably chosen to be between 0.1 and 200 μm, preferably to less than 150 μm and the material is applied into a layer with a thickness of between 0.1 and 3 mm, preferably to a thickness of between 0.3 and 0.6 mm.

For the supplementary release layer, which is applied inside the intermediate layer, the particle size is suitably chosen to be between 0.1 and 100 μm, preferably to less than 45 μm. The layer is suitably applied into a thickness of between 0.1 and 2 mm, preferably into a thickness of between 0.2 and 0.6 mm.

Both the intermediate layer and the supplementary release layer can be applied to the green body and the shape-imparting body by immersion into a slurry of the powdered materials which are included in the respective layers, by spraying or in some other suitable way. A slurry is suitably prepared by the addition of a solvent such as a cyclohexane, a ketone, an ethanol or another alcohol, to a content of 80 to 92 parts by volume to the powdered material. Suitable dispersion and suspension-promoting agents and other surface-active agents can be added to ensure that an essentially fully covering and even coating of the slurry remains on the castings. The application is followed by a drying when the solvent is driven off and a covering even layer of the desired thickness is obtained. Each layer can be applied in one or more steps, with or without intermediate drying, to obtain the desired thickness of the layer.

According to one embodiment of the invention, ceramic-ceramic composites can be produced by passing a fiber thread, in the form of a bundle of a large number of ceramic fibers or alternatively, a single fiber, mono-filament, or a fiber fabric, through at least one bath containing ceramic particles suspended in a polymer melt, whereupon the fiber thread fiber fabric thereby infiltrated with ceramic particles and polymer melt, in the manner described above, is preformed into a green body against a shape-imparting body, is encapsulated together with the shape-imparting body, before the green body is consolidated and sintered into an essentially dense ceramic-ceramic composite by isostatic pressure sintering.

Metal-ceramic composites can be produced while utilizing the invention, whereby a fiber thread in the form of a bundle of a large number of ceramic fibers, or alternatively, a single fiber, mono-filament, or a glass fabric is passed through at least one bath containing a metal melt whereupon the fiber thread/fiber fabric infiltrated with metal melt, in the manner described above, is preformed into a green body against a shape-imparting body, is encapsulated together with the shape-imparting body, before the green body is consolidated and sintered into an essentially dense metal-ceramic composite by isostatic pressure sintering.

Composite bodies with an internal contour or shape are produced while utilizing the invention, whereby the fiber thread fiber fabric is infiltrated and the infiltrated fiber thread/fibers fabric is preformed by winding it onto a shape-imparting core of a material which maintains its shape-imparting properties under the pressures and temperature conditions which prevail during the isostatic pressure sintering. After preforming, the core is encapsulated and the green body preformed on the core is consolidated and sintered in the manner described above. Preferably, a core of graphite or boron nitride is used. Cores of these materials also have the advantage that they can be easily removed from the sintered composite body by mechanical methods such as blasting if the internal structure should not allow the core to be withdrawn from the body. If necessary, graphite cores can be coated with a diffusion-preventing barrier layer to avoid carbon absorption during the pressure sintering. Preferably, the graphite core is coated with a layer of boron nitride.

Preforming of a green body by winding of infiltrated fiber thread/fiber fabric, and surrounding the green body with a dense encapsulation followed by isostatic pressure sintering, is applicable to the manufacture of composite bodies irrespective of the geometry of the body. For example, a base frame of infiltrated fiber thread/fiber fabric can first be clamped by means of a fixture, whereafter infiltrated fiber thread/fiber fabric is wound onto the frame to form a green body of optional shape. A green body can also be built up by winding infiltrated fiber thread/fiber fabric, be removed from the core used during the winding and be shaped into a desired outer contour by applying around the green body an outer mold or a casing of a material which maintains its shape-imparting properties under the pressure and temperature conditions which prevail during the isostatic pressure sintering, for example a casing of graphite or boron nitride. The green body and the casing mentioned are encapsulated, after which the green body is consolidated and sintered in the manner described above.

Composite bodies can also be produced while utilizing the invention whereby fiber fabrics are infiltrated with a matrix according to the above description. These fiber fabrics are then stacked in a mold or a shape-imparting casing, of a material which retains its shape-imparting properties at the pressures and temperature conditions which prevail during the isostatic pressure sintering. After preforming, the mold and the green body preformed in the mold are encapsulated in accordance with the description above, whereafter the green body is consolidated and sintered by isostatic pressure sintering in the manner described above. Preferably, a mold of graphite or boron nitride is used. Molds of these materials also have the advantage of being easily removable from the sintered composite body by mechanical methods such as blasting if the outer form should not allow the mold to be withdrawn from the body. If necessary, graphite mold can be coated with a diffusion-preventing barrier layer to avoid carbon absorption during the pressure sintering. The graphite mold is preferably coated with a layer of boron nitride.

BRIEF DESCRIPTION OF THE DRAWING

The invention will be explained in greater detail in the following with reference to the accompanying figures and examples.

DESCRIPTION OF THE PREFERRED
EMBODIMENTS AND EXAMPLES

EXAMPLE 1

Carbon-silicon nitride composite

A powder slurry was prepared starting from a ceramic powder mixture comprising silicon nitride powder—PERMASCAND P95C—with addition of 6 per cent by weight yttrium oxide—HC STARCK, Grade fine—and 2 per cent by weight aluminium oxide—SUMITOMO, AKP—30—. To this powder mixture was added water with an addition of 0.2 per cent by weight lignosulphate as dispersing agent. After the addition of water, the slurry was adjusted to a pH of 10 and a dry content of around 70 per cent by weight, 41.7 per cent by volume. The dispersion was carried out while grinding in a ball mill for 70 hours.

The slurry obtained was degassed for 24 hours while being magnetically stirred.

After degassing, the slurry was transferred to a tank 2 included in a device for winding fiber thread. A carbon fiber thread—Tonen F700—was taken from a fiber spool 1 and led through the slurry tank 2 where it was infiltrated with the slurry before it was wound into a green body 4 on the graphite core 3.

The body 4 preformed by winding was dried at room temperature.

Figure 1:
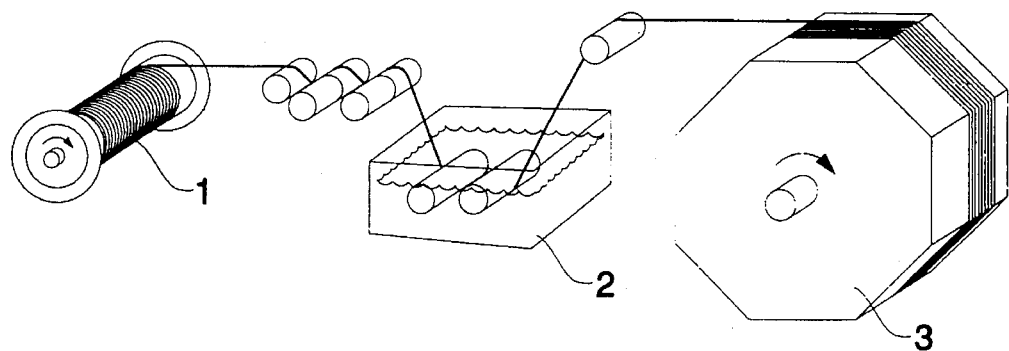
FIG. 1 shows infiltration and winding of fiber thread according to one embodiment of the invention.
Figure 2:
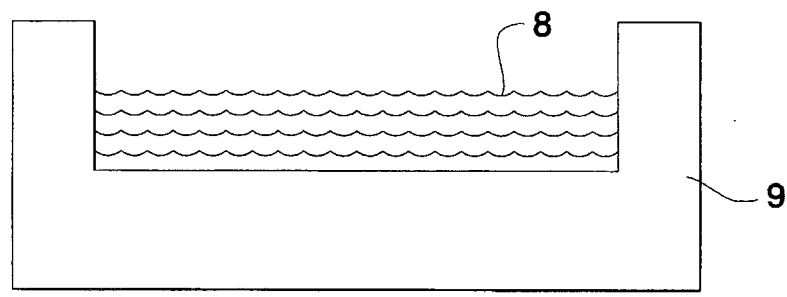
FIG. 2 shows preforming by arrangement or stacking of infiltrated fiber fabric in a mold or a shape-imparting casing.
Figure 3:
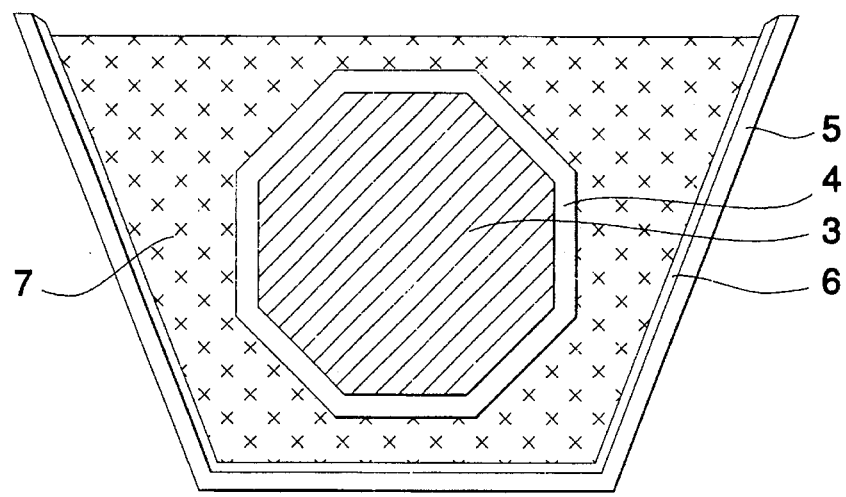
FIG. 3 shows a preformed body and a core arranged surrounded by glass in a crucible.

After drying, the graphite core 3 and the body 4 preformed on the graphite core were place in a graphite crucible 5, which is shown in FIG. 3. The crucible 5 was internally coated with a release layer 6 of boron nitride. A glass powder 7 was supplied to the crucible 5 whereafter the graphite crucible 5 with the core 3, the preformed body 4 and the glass powder 7 was placed in a high-pressure furnace (not shown), where the preformed body 4 with the surrounding glass powder 7 was degassed for 2 hours at room temperature and under vacuum. Thereafter, while maintaining the vacuum, the furnace was heated to a temperature of about 600° C., whereby organic constituents present in the remainder of the green body 4 were driven off. Thereafter, argon was added until a pressure of 0.1 MPa was attained, after which the temperature was raised to 1000° to 1220° C. The furnace was maintained under these conditions for 1 hour, whereby the glass powder melted and formed a dense coherent casing, impenetrable to the pressure medium used, around the green body and the core. The pressure was then raised by pumping in argon gas to 100 MPa and the temperature was raised to between 1650° and 1750° C. The furnace was maintained under these conditions for 2 hours, whereby the green body was sintered and consolidated into an essentially dense ceramic-ceramic composite. After the sintering, the glass encapsulation and the shape-imparting core were removed.

The driving off of organic constituents can also be carried out under flushing gas, preferably nitrogen gas and/or hydrogen gas. The treatment up to 600° C. can also be carried out in a separate furnace, which need not be a high-pressure furnace, after which the crucible with the core, the body and the glass powder is transferred to a high-pressure furnace. The gas, pressure medium, pumped in during the pressure increase may also comprise other inert gases, such as helium and nitrogen gas.

EXAMPLE 2

Aluminium oxide-aluminium oxide composite

A powder slurry was prepared by dispersing aluminium oxide—ALCOA, A 16 SG—in water to which 0.5 per cent by weight polyacrylic acid—DISPEX A40—had been added. The dry content of the slurry was adjusted to about 72 per cent by weight. The preparation was carried out by means of ball mill grinding for 70 hours.

The slurry was degassed for 24 hours while being magnetically stirred.

After the degassing, the slurry was transferred to a tank 2 included in the equipment for winding fiber thread. An aluminium oxide fiber—ALMAX, MITSUI—was led from the fiber spool 1, through the tank 2, where it was infiltrated with slurry before it was wound into a green body 4 on the graphite core 3.

The body 4 preformed by winding was dried at room temperature before it was encapsulated and sintered in a high-pressure furnace in accordance with the description in Example 1. However, the high-pressure sintering was carried out at a temperature of between 1450° and 1550° C.

EXAMPLE 3 carbon-silicon nitride composite

A polymer melt was prepared by mixing, at a temperature of about 150° C., 60 parts by volume of a silicon nitride-based ceramic powder with a mean grain size of 1 μm-H C Starck, grade H1—and containing 1.1 part by volume yttrium oxide, with—40 parts by volume of a temporary binder comprising: 32.4 parts by volume paraffin, melting temperature 58°–60° C., 6.9 parts by volume ethylene-vinyl acetate polymer with a melting index of 400 g/min (ASTM 1238 Modified) and a density of 0.951 g/cm3—ELVAX®—from Du Pont), and 0.7 parts by volume Carnauba wax.

The mixture of ceramic powder and polymer melt was supplied to a tank 2 included in the winding equipment and was maintained at 150° C. Carbon fibre—Tonen, F700—was led from the fiber spool 1, through the tank 2, where it was infiltrated with ceramic powder and polymer melt before it was wound into a green body 4 on the graphite core 3.

The wound structure 4 was placed in a vacuum furnace where the polymer was driven off under a vacuum of about 0.1 mbar while successively raising the temperature under slow heating, about 1.5° C./hour to 350° C., thereafter somewhat faster, 15° C./hour, to 600° C. After cooling and pressure equalization, the body 4 was withdrawn from the vacuum furnace, whereupon it was placed in a graphite crucible 5, was surrounded and pressure sintered in accordance with Example 1.

EXAMPLE 4

Silicon carbide-silicon nitride composite

A slurry was prepared and degassed in accordance with Example 1 and was transferred to a tank for infiltration of fiber fabrics. Fiber fabrics 8 of silicon carbide—NICALON NL-607 from NIPPON CARBON, Japan—of HS type with a size of 100×100 mm were immersed into the slurry tank and stacked in a graphite mold 9.

The green body preformed by stacking of slurry-infiltrated fiber fabrics was dried at room temperature before the green body, formed from infiltrated fiber fabrics, and the shape-imparting graphite mold 9 were encapsulated. Thereafter, the green body was sintered in a high-pressure furnace in accordance with the description in Example 1. However, the high-pressure sintering was performed at a temperature of between 1550° and 1650° C.

What is claimed is:

1. A method of manufacturing fiber-reinforced composites from a fibrous material, said method comprising the steps of:

infiltrating said fibrous material with material from which a matrix is built up;

preforming said infiltrated fibrous material into a green body against a shape-imparting body;

encapsulating said preformed green body and said shape-imparting body with an encapsulation material;

consolidating and sintering said encapsulated green body by means of isostatic pressure sintering into an essentially dense composite body while preventing deformation of the green body with said shape-imparting body; and removing said encapsulation material and shape-imparting body from said green body after said isostatic pressure sintering.

2. A method according to claim 1 further including the step of infiltrating said fibrous material with ceramic materials from which a ceramic matrix is built up.

3. A method according to claim 2 wherein said infiltrating step is performed by passing the fiberous material through at least one bath containing a slurry or powder slurry of said ceramic materials.

4. A method according to claim 3 wherein said shape-imparting body is a shape-imparting core and wherein said preforming is performed by winding said infiltrated fibrous material onto said shape-imparting core.

5. A method according to claim 3 wherein said shape-imparting body is a mold or a shape-imparting casing and said preforming is performed by stacking said infiltrated fiber fabric in said mold or said shape-imparting casing.

6. A method according to claim 2 wherein said infiltrating step is performed by passing the fiberous material through a polymer melt containing said ceramic material in the form of suspended ceramic particles.

7. A method according to claim 6 wherein said shape-imparting body is a shape-imparting core and wherein said preforming is performed by winding said infiltrated fibrous material onto said shape-imparting core.

8. A method according to claim 6 wherein said shape-imparting body is a mold or a shape-imparting casing and said preforming is performed by stacking said infiltrated fiber fabric in said mold or said shape-imparting casing.

9. A method according to claim 2 wherein said shape-imparting body is a shape-imparting core and wherein said preforming is performed by winding said infiltrated fibrous material onto said shape-imparting core.

10. A method according to claim 2 wherein said shape-imparting body is a mold or a shape-imparting casing and said preforming is performed by stacking said infiltrated fiber fabric in said mold or said shape-imparting casing.

11. A method according to claim 1 wherein said shape-imparting body is a shape-imparting core and wherein said preforming is performed by winding said infiltrated fibrous material onto said shape-imparting core.

12. A method according to claim 1 wherein said shape-imparting body is a shape-imparting casing and said preforming is performed by stacking said infiltrated fiber fabric in said shape-imparting casing.

13. A method of manufacturing fiber-reinforced composites from a fibrous material, said method comprising the steps of:

infiltrating said fibrous material with material from which a matrix is built up;

preforming said infiltrated fibrous material into a green body by winding said fibrous material onto a shape-imparting core;

removing said core;

shaping the green body to a desired outer contour by applying a shape-imparting casing around the green body;

encapsulating said preformed green body and said shape-imparting casing with an encapsulation material;

consolidating and sintering said encapsulated green body by means of isostatic pressure sintering into an essentially dense composite body while preventing deformation of the green body with said shape-imparting casing; and removing said encapsulation material and said shape-imparting casing from said green body after said isostatic pressure sintering.

14. A method according to claim 13 wherein said fibrous material is infiltrated with ceramic materials from which a ceramic matrix is built up.

15. A method according to claim 14 wherein said infiltrating step is performed by passing the fiberous material through at least one bath containing a slurry or powder slurry of said ceramic materials.

16. A method according to claim 14 wherein said infiltrating step is performed by passing the fiberous material through a polymer melt containing said ceramic material in the form of suspended ceramic particles.

* * * * *